United States Patent [19]

Malacheski et al.

[11] 4,132,027
[45] Jan. 2, 1979

[54] INSECT CAPTURING DEVICE

[76] Inventors: Joseph J. Malacheski, 28 E. Division St.; Richard J. Zenda, 21 O'Neill Ave., both of Wilkes-Barre, Pa. 18702

[21] Appl. No.: 801,107

[22] Filed: May 27, 1977

[51] Int. Cl.² .................. A01M 3/00; A01M 5/02
[52] U.S. Cl. .............................. 43/134; 43/110
[58] Field of Search .............. 43/134, 135, 133, 139, 43/110

[56] References Cited

U.S. PATENT DOCUMENTS

| 798,825 | 9/1905 | Petersen | 43/135 |
| 1,308,497 | 7/1919 | Jolly | 43/139 |

Primary Examiner—Jimmy C. Peters
Attorney, Agent, or Firm—Robert K. Youtie

[57] ABSTRACT

An insect capturing device including a handle carrying an outwardly facing receiver and a catcher shiftable toward and away from the receiver for catching an insect and depositing it in the receiver.

13 Claims, 6 Drawing Figures

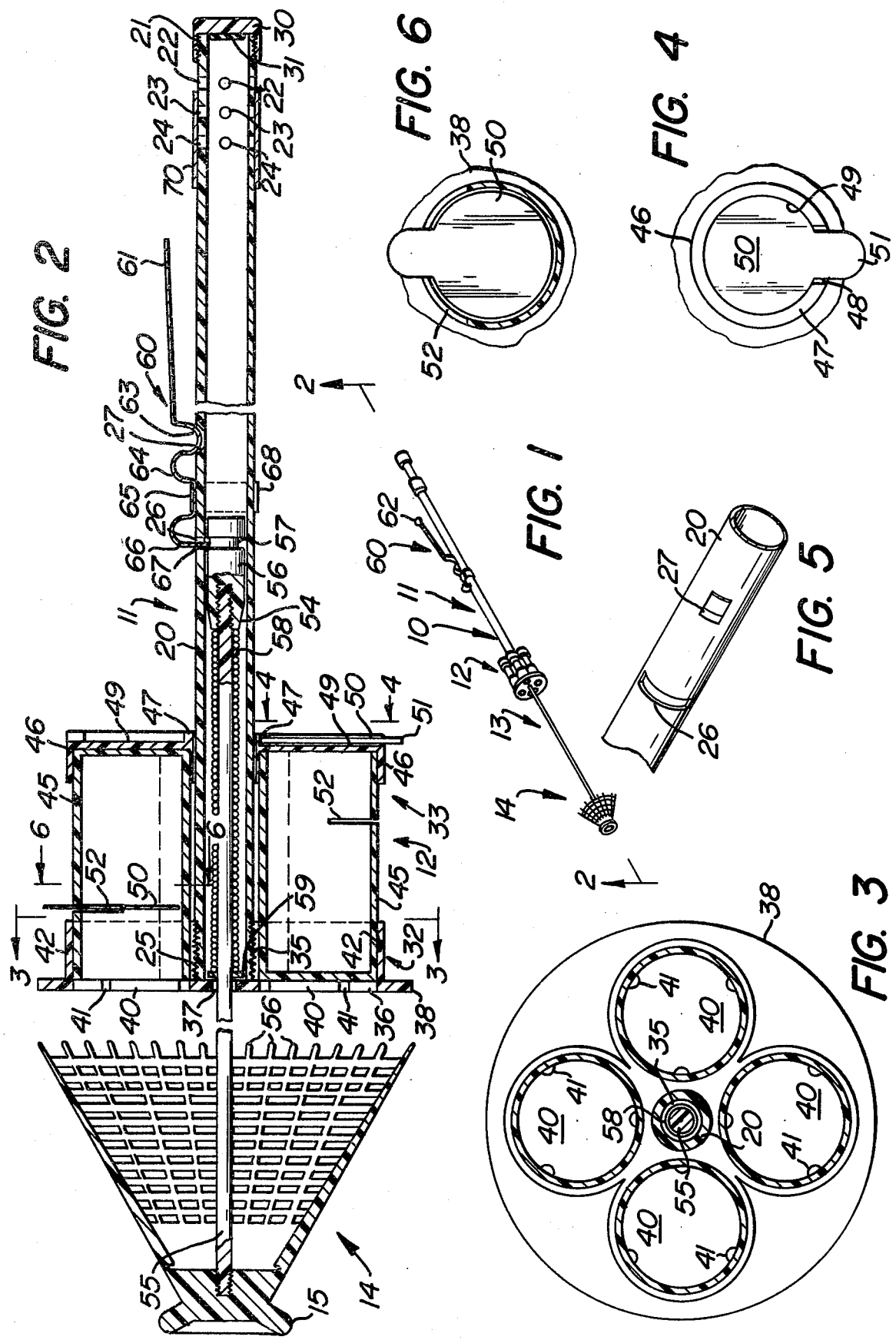

INSECT CAPTURING DEVICE

BACKGROUND OF THE INVENTION

As is well known, insects and like small animal life are often very difficult to capture, especially with safety to the persons involved as well as to the animal life being obtained. Heretofore nets have been the primary means for capturing insects, and these are subject to serious drawbacks, including the lack of positive retention, need for handling in withdrawal, likelihood of injury to the captured insect, the need for agility, speed and skill, among many other reasons.

SUMMARY OF THE INVENTION

It is, therefore, an important object of the present invention to provide a unique and extremely simple insect capturing device which overcomes the above mentioned difficulties, is capable of highly effective use without special training, agility or skill, substantially assures capture without injury to the insect, permitting withdrawal of the insect in a proper container without handling by the operator or posing any hazard to the operator's safety.

It is another object of the present invention to provide an insect capturing device having the advantageous characteristics mentioned in the preceding paragraph which is extremely simple in construction for economical manufacture and sale in mass markets as a toy, while being of sturdy construction and reliability in operation throughout a long useful life for utilization by scientists and other animal life collectors.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a perspective view showing an insect capturing device constructed in accordance with the teachings of the present invention and in an open, set or cocked condition.

FIG. 2 is a longitudinal sectional view taken generally along the line 2—2 of FIG. 1, enlarged for clarity and broken away to conserve drawing space.

FIG. 3 is a transverse sectional view taken generally along the line 3—3 of FIG. 2.

FIG. 4 is a partial transverse sectional view taken generally along the line 4—4 of FIG. 2.

FIG. 5 is a partial perspective view of the handle of the instant device, broken away to conserve drawing space, and enlarge for clarity.

FIG. 6 is a partial transverse sectional view taken generally along the line 6—6 of FIG. 2.

DESCRIPTION OF THE PREFERRED EMBODIMENT

Referring now more particularly to the drawings, and specifically to FIG. 1 thereof, the insect capturing device is there illustrated in toto and generally designated 10. Broadly, the insect capturing device includes a longitudinally elongate handle 11 having at one end insect receiving means 12. Mounting means 13 is longitudinally extensile and retractile with respect to the handle 11 and carries on its outer end an insect catcher 14. As will appear more fully hereinafter, the insect catcher 14, being generally hollow in the direction toward the receiver 12 catches an insect and conveys the same to the receiver for retention thereby.

Considering now the enlarged sectional view of FIG. 2, the handle 11 may be seen as defined by an elongate hollow open ended tube 20, say fabricated of plastic or other suitable material. The inner end region of tube 20, rightward as seen in the drawings, may be externally threaded, as at 21, and spaced adjacent to but inwardly of the threaded region 21 there may be provided a series of longitudinally spaced groups of annularly arranged through openings or holes 22, 23 and 24. The annular array of through holes 22 may be adjacent to the end of handle tube 20, and the annular arrays or groups of holes 23 and 24 may be successively spaced inwardly from the holes 22 and 23, respectively. The other or outer end region of handle tube 20 may be externally threaded, as at 25, and an intermediate region of tube 20 may be provided with an arcuate partially circumferential slot 26, and adjacent thereto and spaced inwardly therefrom a longitudinal cutout or opening 27. As best seen in FIG. 5, the longitudinal handle opening 27 extends along a longitudinal axis generally bisecting the arc of partial circumferential slot 26. Further, opposite end edges of longitudinal opening 27 are beveled or inclined to face upwardly and outwardly.

Provided on the inner end of handle tube 20 may be a closure or cap 30, say internally threaded for removable engagement with external tube threads 21. Interiorly of the end closure or cap 30 is a pad, cushion or bumper 31 of suitable resilient material, such as rubber, or the like, and facing into the inner end of tube 20.

On the outer end of the handle tube 20 is the receiver 12 which may include a holder or retaining member 32 carrying a plurality of cups or receptacles 33. More specifically, the holder or retaining member 32 may include a cylindrically hollow central part or hub 35 having internal screw threads and circumposed in threaded engagement about the external screw threads 25 of the handle tube 20. Just outward of the outer end of handle tube 20, the holder 32 may include a generally circular plate or disc 36 having a central through opening or hole 37 communicating with the interior of handle tube 20 and extending radially outwardly therefrom to a generally circular periphery 38 substantially concentric with the tube 20. The plate or disc 36 may be formed with a plurality of through openings or holes 40, which may be four in number, as illustrated, or otherwise, and which are each provided at spaced locations thereabout a plurality of yieldable internal projections or nubs 41. Carried by the plate or disc 36, extending circumferentially about each opening or hole 40 is a tubular retaining ring or loop 42. The retaining loops 42 may extend from the plate 36 longitudinally inwardly of and parallel to the handle tube 20.

A plurality of generally cylindrical receptacles or cups 45, each having one end open and one end closed, are respectively snugly engaged in the several retaining loops 42. For example, as seen in FIG. 2 the lower retaining loop 42 receives a receptacle 45 with the closed receptacle end proximate to and in closing relation with the lower opening 40. The upper receptacle or cup 45 is arranged with its open end adjacent to and opening through the adjacent opening 40, its closed end being spaced inwardly from the plate 36. Provided removably in a storage position over the inner end of each receptacle or cup 45 is a receptacle closure or cap 46. That is, the upper receptacle closure or cap 46 is removably engaged over the inner closed end of upper receptacle 45, and the lower receptacle closure or cap 46 is removably engaged over and in closing relation with the inner open end of the lower receptacle 45. The caps 46 may be frictionally or otherwise removably engaged on respective receptacles 45. For reasons which will become apparent hereinafter, the receptacles 45 are selectively carried by respective retaining members or loops 42 with their open ends proximate to and opening through the plate opening 40 (as is shown in FIG. 2), or remote from the plate with the closed receptacle end closing the respective plate opening (not shown).

Adjacent to and spaced from the open end of each receptacle 45, there is provided in the receptacle side wall a generally semi-circular slit or slot 52. The outer side of each receptacle closure or cap 46 is provided with a circumferential rim or flange 47 having a gap or opening 48 and combining with the cap wall to define a pocket 49. The pocket 49 is adapted to snugly and removably receive a generally flat partition member or disc 50 having a generally coplanar finger pull or tab 51 extending radially outwardly through and beyond the rim opening 48.

In the condition shown in FIG. 2, the lower receptacle cap 46 has its pocket 49 provided therein with a partition 50 frictionally retained therein and manually removable therefrom by deliberate pull on the tab 51. In the pocket 49 of upper receptacle cap 46 there is no partition 50. However, such partition is shown inserted through slot 52 to extend in closing relation across the upper receptacle 45, for purposes appearing presently in greater detail.

The mounting member 13 may be comprised of an elongate rod 55 extending spacedly through the central plate opening 37 and having an enlargement 56, in the nature of a piston, on its inner end slidably received in the handle tube 20. The enlargement or piston 56 may be formed with a circumferential groove 57, and a coil compression spring 58 is circumposed about the rod within the tube 20 havings its opposite ends in bearing engagement with the enlargement or piston 56 and a bearing engagement washer 59 between the spring and the plate 36 to urge the mounting rod 55 toward its longitudinally retracted position.

Carried on the outer end of the mounting rod 55 is the catcher 14, which may be of a hollow open-work or reticulate configuration, say frusto-conical as illustrated, or other suitable configuration with its interior hollow facing toward the receiver 21. The catcher 14 may be advantageously fabricated of soft resiliently flexible material, such as plastic, or the like to avoid injury to insects being captured. The smaller, outer closed end of the catcher 14 may be provided with an enlargement, finger-grip part or knob 15 to facilitate manual grasping and opening or recocking, as will appear presently. The open larger diameter of the conical frustum configuration of catcher 14 may be provided with a plurality of reasonably flexible extensions or fingers, as at 56, extending obliquely toward the receiver 12, for gently guiding an insect toward the interior hollow of the catcher.

Exteriorly along an inner region of the handle 11 is provided an operating member or lever 60. The lever may be of elongate strip-like construction including an elongate inwardly extending handle portion 61 which terminates at its inner end in an enlarged finger press 62. Spaced from the finger press 62, the lever 60 is provided with an inwardly extending bight 63 entering into the longitudinal tube opening 27 and rockable therein for swinging movement of the arm 61. The bight region 27 thereby defines a fulcrum mounting the arm 61, and opposite to the arm the strip or lever extends from the bight region 27 to an outwardly projecting arcuate portion 64, thence to a flat portion 65 extending longitudinally closely along the tube 20, and finally to an outwardly projecting bight portion 66 terminating in an end portion or pawl 67 engagable through slot 26. A resilient member or band 68 may be circumposed about the flat strip portion 65 and adjacent region of tube 20, to yieldably urge the lever 60 toward its position illustrated in FIG. 2. However, the lever 60 is swingable about its fulcrum 63 upon depression of arm 61 and thumb press 62 against the resilient restoring force of band 68 to swing end portion or pawl 67 outwardly with respect to slot 26. In the condition shown in FIG. 2 it will be observed that lever end or pawl 67 engages in the slot 57 of piston 56 to retain the latter in position, the extended position of mounting rod 56 and catcher 14. Upon depression of lever finger press 62, lever end or pawl 67 is withdrawn from groove 57 to release rod 55 and catcher 14 for retractile movement under the force of spring 58. The piston 56 retracts toward and into resilient impact with pad 31. Circumposed about the handle tube 20, in the region of openings 22, 23 and 24, is a closure sleeve or tube 70 slidable to close one or more of the groups of apertures. By closure of one or more groups of apertures 22, 23 and 24 by closure sleeve 70, pneumatic or fluid pressure interiorly of handle tube 20 is built up upon release of piston 56 for movement toward closure cap 30. Thus, the groups of apertures 22, 23 and 24 provide fluid escape or vent means, and the more apertures uncovered or open, the less resistance to retractile movement of piston 56 and rod 55. The closure sleeve 70 thereby serves to selectively retard and determine the speed of retraction of rod 55 and catcher 14.

The rod 55 may be extended, as by manually grasping and withdrawing the knob 15 of catcher 14, during which the pawl 67 rides outwardly on the sloped or conical portion 54 of piston 56 and snaps into the slot 57 to retain the catcher in open or cocked position.

In the open or cocked condition shown in FIGS. 1 and 2, with the catcher 14 properly positioned to catch a desired insect, the lever 60 may be manually depressed to retract the catcher and thereby catch the insect. With the insect thereby caught in the hollow catcher and transported therefrom into a receptcle 45, the disc 50 may then be removed from pocket 49 and inserted into slot 52 so that disc 50 may prevent said insect from escaping, as by flying or crawling, from the receptacle when the latter is in or removed from retaining loop 42.

The receptacle or cup 45 may then be withdrawn from its retaining loop 42 and the closure cap 46 removed from the closed receptacle end and placed on the open receptacle end, after which the disc or trap partition 50 may be withdrawn and engaged in pocket 49 of the closure 46. The closed end of the receptacle 45 may then be inserted outwardly into retention loop or ring 42 into engagement with limiting nubs 41, the condition of the lower receptacle 45. This procedure may be repeated until all receptacles contain insects. Of course, the insect containing receptacles need not be carried by the retaining loops 42, but may be placed in storage and empty receptacles employed.

From the foregoing it is seen that the present invention provides an insect capturing device which is extremely simple and entirely safe in operation, of durable and reliable structure, and otherwise fully accomplishes its intended purposes.

Although the present invention has been described in some detail by way of illustration and example for purposes of clarity of understanding, it is understood that certain changes and modifications may be made within the spirit of the invention.

What is claimed is:

1. An insect capturing device comprising a handle, a receiver carried by said handle and having an outwardly facing opening, a catcher carried by said handle outwardly of said receiver and facing inwardly toward said receiver, mounting means mounting said catcher for movement inwardly toward and outwardly away from said receiver to transport an insect toward and into said receiver, resilient means urging said catcher inwardly toward said receiver, and releasable detent means for holding said catcher away from and releasing said catcher for movement inwardly toward said receiver.

2. An insect capturing device according to claim 1, said receiver comprising a holder carried by said handle, and a receptacle removably carried by said holder for receiving and containing an insect.

3. An insect capturing device according to claim 2, said holder comprising a retaining member opening toward said catcher, said receptacle having one end open and being configured for conforming engagement in said retaining member with said one end facing selectively toward said catcher for receiving an insect and away from said catcher for containing an insect, and a closure removably engageable in closing relation with said one receptacle end when the latter is facing away from said catcher.

4. An insect capturing device according to claim 3, in combination with trap means associated with said receptacle for closing the latter when facing toward said catcher to trap an insect.

5. An insect capturing device according to claim 4, said trap means comprising a plate removably extendable transversely through and across said receptacle.

6. An insect capturing device according to claim 5, said plate and closure being configured for selective interfitting engagement for storage on the other receptacle end when said one receptacle end faces toward said catcher.

7. An insect capturing device according to claim 1, said catcher being of internally hollow reticulate formation with its hollow facing toward said receiver.

8. An insect capturing device according to claim 7, said mounting means comprising a retractile extension on said handle.

9. An insect capturing device according to claim 8, in combination with resilient means biasing said extension toward its retracted condition, said detent means releasably retaining said resilient means against said biasing for selective release of said resilient means to retract said extension and shift said catcher toward said receiver.

10. An insect capturing device according to claim 9, in combination with retarding means for selectively retarding the movement of said catcher.

11. An insect capturing device according to claim 10, said extension means including piston means, said handle including cylinder means receiving said piston means upon retraction of said extension, and said retarding means comprising selectively operable fluid vent means associated with said cylinder means.

12. An insect capturing device according to claim 1, said handle comprising a tube having one end closeed to define a cylinder, said catcher mounting means comprising a shaft mounted for extensile and retractile shifting in said tube, a piston on the inner end of said shaft in fluid compressing relation within said cylinder, said resilient means comprising a coil compression spring between said tube and shaft and urging the latter toward its retracted position, and said detent means comprising a manually actuable lever releasably engageable with both said tube and shaft to retain the latter against the force of said spring.

13. An insect capturing device according to claim 12, said lever being located exteriorly of said tube and including a transverse engaging portion for removable entry through said tube and into interfitting relation with said shaft.

* * * * *